No. 691,699. Patented Jan. 21, 1902.
F. K. FASSETT.
SIDE BEARING FOR RAILWAY CARS.
(Application filed July 8, 1901.)
(No Model.)
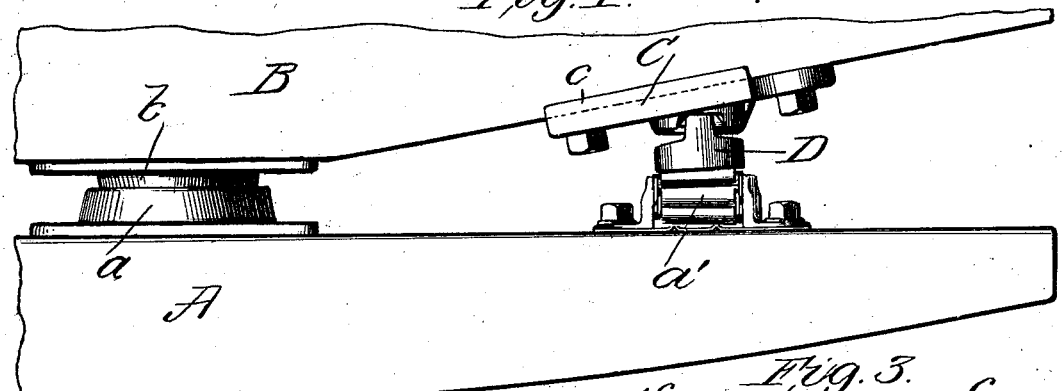
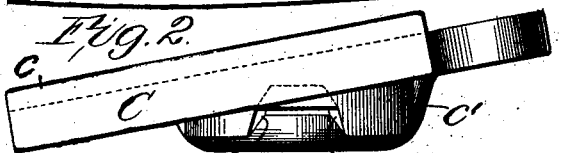
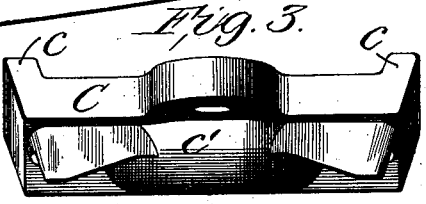
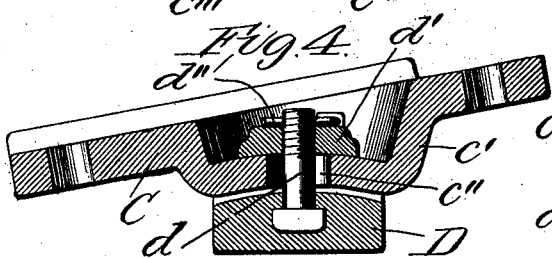
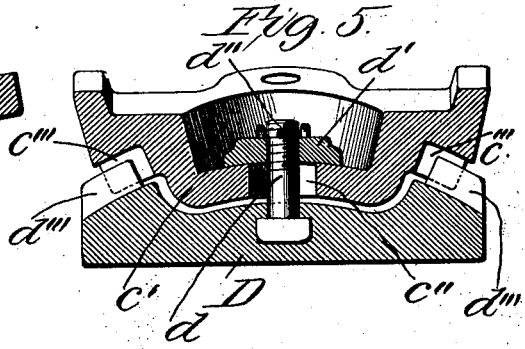
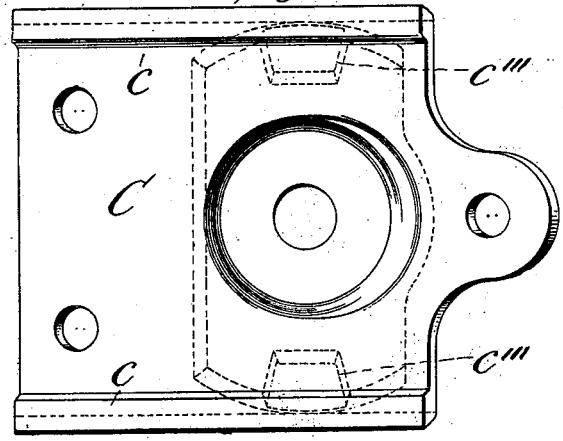
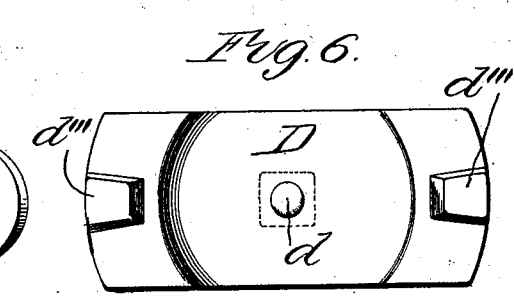
Inventor:
Francis K. Fassett,
by Bakewell & Cornwall
Attys.
Attest:

UNITED STATES PATENT OFFICE.

FRANCIS K. FASSETT, OF ST. LOUIS, MISSOURI, ASSIGNOR, BY MESNE ASSIGNMENTS, TO CHICAGO RAILWAY EQUIPMENT COMPANY, OF CHICAGO, ILLINOIS, A CORPORATION OF ILLINOIS.

SIDE BEARING FOR RAILWAY-CARS.

SPECIFICATION forming part of Letters Patent No. 691,699, dated January 21, 1902.

Application filed July 8, 1901. Serial No. 67,421. (No model.)

*To all whom it may concern:*

Be it known that I, FRANCIS K. FASSETT, a citizen of the United States, residing at St. Louis, Missouri, have invented a certain new and useful Improvement in Side Bearings for Railway-Cars, of which the following is a full, clear, and exact description, such as will enable others skilled in the art to which it appertains to make and use the same, reference being had to the accompanying drawings, forming part of this specification, in which—

Figure 1 is a side elevational view of a portion of the body-transom and truck-bolster, showing my improved side bearing in position thereon. Fig. 2 is a side elevational view of the socket member of the top bearing. Fig. 3 is an edge elevational view of the same. Fig. 4 is a vertical longitudinal section through the top bearing. Fig. 5 is a vertical cross-sectional view through the same. Fig. 6 is an inverted plan view of the socket member of the top bearing, and Fig. 7 is a top plan view of the spherical bearing member of the top bearing.

This invention relates to the new and useful improvement in side bearings for railway-cars, the invention being designed particularly as an improvement upon what is known as the "top side bearing," being a bearing which is arranged upon the lower face of the body-transom.

It is well known that in car construction the usual arrangement is to provide body-transoms at or near each end of the car, said body-transoms forming the main supports for the car-body. These body-transoms carry what are known as "center" bearings, in which are arranged the king-pins or pivot-bolts for the trucks. The center bearings on the body-transoms coöperate with center bearings on the truck-bolsters, whereby the car is supported at each end. At or near each end of the truck-bolsters are arranged what are known as "side" bearings. These side bearings usually project above the top surfaces of the truck-bolsters and coöperate with bearing-plates secured to the under faces and at or near the ends of the body-transoms.

The side bearings on the truck-bolsters, so far as my present invention is concerned, may be of any usual construction—that is, may be in the form of a roller side bearing, a plain side bearing, &c. The bearing-plate of the top side bearing has heretofore been commonly employed as a member rigidly attached to the body-transom, or in exceptional cases springs have been arranged above the bearing-plate in order to absorb shocks or jars communicated to the side bearing.

The purpose and function of the side bearing is so well known that it is deemed unnecessary here to refer to the same, except to state that the usual practice is to so arrange the "top" and "bottom" bearings, as they are called, that a space or clearance is left between. When the car is being switched or making a curve and the body lurches or swings from side to side, these bearings serve to limit the swinging motion and tend to keep the car in its proper position. In some cases, due to unequal loading or shifting of the load or from other causes, side bearings on one side or the other may remain in contact with each other and transmit part of the load to the truck-bolster in this manner. Thus where springs are employed to sustain either of the bearing members these springs are under undue compression.

It is not usually the practice nor the intention to have the top bearing contact with the lower bearing, so that the body of the car will be supported either wholly or in part by the side bearings. The bearing-plates on the top transoms as usually constructed, as stated before, are rigid with respect to said transoms and when in contact with the lower bearing-plate or rollers seldom have a uniform bearing thereon. This may be caused by uneven wearing or inequalities in the manufacture or the assemblage of the devices.

The object of my present invention is to so construct the top bearing-plate that it will have a uniform bearing on the lower member of the side bearing, whether said lower member is in the form of rollers, a rigid bearing-plate, or other forms. Another object is to provide means whereby this top bearing-plate while permitted to have certain freedom of movement is kept within certain bounds, so as to be in readiness at all times to uniformly bear on the lower bearings; and another object of my invention is to construct a top bearing-plate of the character described in a simple and inexpensive manner, employing a small number of parts, which parts are easy of assemblage, they being so combined and arranged as to be readily disassociated from each other for the purpose of repair.

With these objects in view the invention consists in the construction, arrangement, and combination of the several parts, all as hereinafter described, and afterward pointed out in the claims.

In the drawings, A indicates the truck-bolster, $a$ the center bearing thereon, and $a'$ the lower side bearing, all of said parts being of any ordinary or approved construction.

B indicates the body-transom, upon which is arranged the usual center bearing $b$.

C indicates a plate secured to the body-transom, said plate in this instance forming a member of the top side bearing. Where the body-transom is made of cast metal, it is obvious that the same can be formed and shaped so as to dispense with the employment of a separate plate, such as shown in the drawings. This plate C is provided with marginal flanges $c$ at two sides for receiving the body-transom, whereby the plate is held firmly against lateral movement. Suitable bolts or rivets are also employed for securing said plate through its flanges to the body-transom.

Plate C is formed or provided with an embossed seat $c'$, whose lower face is preferably concaved, so as to provide a socket for the bearing plate or block. $c''$ indicates an aperture in the embossment for the passage of the securing means for the bearing plate or block. $c'''$ indicates recesses preferably arranged on each side of the embossment, as shown in Fig. 5.

D indicates the bearing plate or block, provided with a threaded projection $d$, designed to pass through the aperture $c''$, the upper end of said projection receiving a nut $d'$, whose lower face is preferably concaved, so as to coöperate with the convexed inner face of the embossment. A cotter-pin $d''$ is preferably passed through the shank $d$ above the nut for the purpose of holding said nut in position. This threaded projection or shank $d$, as it has been termed, is preferably a bolt whose head is embedded in the casting forming the bearing plate or block, as shown in Figs. 4 and 5. The upper face of this bearing plate or block D is convexed, so as to coöperate with the concaved side of the embossment, while on each side of said convexed portion the bearing plate or block is provided with projections $d'''$, which are received in the recesses $c'''$ in the lower face of plate C.

In operation the parts are assembled so that the bearing plate or block is not seated in the concaved portion of the embossment, a space being left, as shown in Figs. 4 and 5, which space permits the bearing plate or block to move freely in all directions, said plate or block being sustained in position by means of its shank $d$. It will be observed that the aperture $c''$ is of such size that the shank $d$ is free to move therein, so that when the bearing-plate D comes in contact with the lower bearing on the truck-bolster it will first adjust itself properly, so as to find and have a uniform contact with said lower bearing, after which, if the car-body continues its side movement, the convexed portion of the bearing plate or block will seat itself in the concavity of the embossment. Should the truck swing when the parts are in this position so that the bearing plate or block rides over the lower bearing, the ball-and-socket joint, provided as above indicated, will accommodate itself to any inequalities in the lower bearing-plate. This movement of course is restricted by the projections on the bearing-plate striking the side walls of the recesses which receive them; but ordinarily the ball-and-socket joint will tend to center the bearing-plate, so that the shank $d$ will not contact with the edges of the aperture $c''$. In this operation it will be obvious that the nut is lifted above the inner face of the embossment and will not in any way retard the movement of the bearing-plate.

So far as I am aware I am the first to use the suspended top bearing, which suspended bearing is associated with a member whereby when it is seated home it may have a universal movement, which movement has such limits as will prevent the displacement of the universal top bearing.

I am aware that many minor changes in the construction, arrangement, and combination of the several parts of my device can be made and substituted for those herein shown and described without in the least departing from the nature and principle of my invention.

Having thus described my invention, what I claim, and desire to secure by Letters Patent of the United States, is—

1. In a side bearing for railway-cars, the combination with the lower bearing on the truck-bolster, and a loosely-suspended top bearing which, in operation, is practically immovable in its seat; substantially as described.

2. In a side bearing for railway-cars, the combination of a lower bearing on a truck-bolster, and a self-adjustable top bearing which universally engages the bottom bearing in the movement of said bearings toward each other, before the load is applied; substantially as described.

3. In a side bearing for railway-cars, the combination with the lower bearing loosely suspended from the truck-bolster, of a top bearing on the body-transom, and a ball-and-socket connection between said top bearing and the body-transom whereby, said top bearing is self-adjustable, and uniformly bears upon the bottom bearing in the movement of said bearings toward each other, before the load is applied; substantially as described.

4. In a side bearing for railway-cars, the combination with the lower bearing on the truck-bolster, of a top bearing on the body-transom, said top bearing comprising a universally-movable bearing plate or block free to move before the load is applied, and a seat for coöperating with said bearing plate or block said seat affording a rigid connection between the bearing-plate and transom when the load is applied; substantially as described.

5. The herein-described member of a side bearing for railway-cars, the same comprising a concaved seat, a movable bearing-plate provided with a convexed portion coöperating with said seat, and means for loosely suspending said bearing-plate in position, whereby, it is free to move in all directions before the load is applied.

6. The herein-described member of a side bearing for railway-cars, the same comprising an apertured concaved seat, a bearing-plate provided with a convexed portion coöperating with said seat, a shank extending from the bearing-plate and passing through the aperture in the concaved seat, and means for limiting the movement of the bearing-plate in its seat; substantially as described.

7. The herein-described member of a side bearing for railway-cars, the same comprising the combination, with a plate provided with an embossed apertured seat, the said plate also having recesses on each side of said seat, a bearing plate or block coöperating with said seat and having lugs on each side thereof, received in the aforesaid recesses, a shank extending from the bearing plate or block through the aperture in the seat, and means on the end of said shank for engaging the inner face of the embossment for supporting the bearing plate or block in position; substantially as described.

8. The combination with the plate C, having flanges $c$, an embossment $c'$, and aperture $c''$ in said embossment, and recesses $c'''$, of a bearing plate or block having a convexed face, $d$, passing through the aperture in said embossment, a nut on the upper end of said shank, and lugs $d'''$, which are received by the recesses $c'''$; substantially as described.

9. The combination with the concaved seat formed with an aperture, of a bearing-plate provided with a shank of smaller diameter than the aperture in said seat, said shank passing through said aperture, and means on the upper end of the shank for engaging the inner face of the seat, whereby, the bearing-plate is suspended in position, and a clearance left therebetween and the aperture; substantially as described.

In testimony whereof I hereunto affix my signature, in the presence of two witnesses, this 6th day of July, 1901.

FRANCIS K. FASSETT.

Witnesses:
GEORGE BAKEWELL,
WM. H. SCOTT.

It is hereby certified that in Letters Patent No. 691,699, granted January 21, 1902, upon the application of Francis K. Fassett, of St. Louis, Missouri, for an improvement in "Side Bearings for Railway-Cars," an error appears in the printed specification requiring correction, as follows: On page 2, lines 127-128, the words "loosely suspended from the truck-bolster" after the word "bearing," line 127, should be stricken out and inserted after the word "bearing," line 129; and that the said Letters Patent should be read with this correction therein that the same may conform to the record of the case in the Patent Office.

Signed, countersigned, and sealed this 25th day of February, A. D., 1902.

[SEAL.]

F. L. CAMPBELL,
*Assistant Secretary of the Interior.*

Countersigned:
    F. I. ALLEN,
        *Commissioner of Patents.*